[19] United States Patent
Brazas et al.

(10) Patent No.: US 10,170,012 B2
(45) Date of Patent: Jan. 1, 2019

(54) COMMUNICATION SYSTEM AND METHOD

(71) Applicants: Megan Brazas, Arlington Heights, IL (US); Bruce Brazas, Batavia, IL (US)

(72) Inventors: Megan Brazas, Arlington Heights, IL (US); Bruce Brazas, Batavia, IL (US)

(73) Assignee: Core Vocabulary Exchange System Solution, Inc., Arlington Heights, IL (US)

( * ) Notice: Subject to any disclaimer, the term of this patent is extended or adjusted under 35 U.S.C. 154(b) by 306 days.

(21) Appl. No.: 15/075,324

(22) Filed: Mar. 21, 2016

(65) Prior Publication Data

US 2016/0300498 A1 Oct. 13, 2016

Related U.S. Application Data

(60) Provisional application No. 62/143,881, filed on Apr. 7, 2015.

(51) Int. Cl.
| | |
|---|---|
| G09B 1/16 | (2006.01) |
| G09B 1/06 | (2006.01) |
| G09B 17/02 | (2006.01) |
| G09B 19/06 | (2006.01) |

(52) U.S. Cl.
CPC ............... G09B 1/06 (2013.01); G09B 17/02 (2013.01); G09B 19/06 (2013.01)

(58) Field of Classification Search
None
See application file for complete search history.

(56) References Cited

U.S. PATENT DOCUMENTS

| | | | | | |
|---|---|---|---|---|---|
| 2,946,137 | A | * | 7/1960 | Worth | A63H 33/38 283/46 |
| 3,316,669 | A | * | 5/1967 | Nachbar | A63H 33/38 273/DIG. 30 |
| 3,512,273 | A | | 5/1970 | Baker et al. | |
| 4,176,473 | A | * | 12/1979 | Rae | A63H 33/22 281/15.1 |
| 4,227,328 | A | * | 10/1980 | Clipper, Jr. | B42D 1/08 40/530 |
| 4,264,011 | A | * | 4/1981 | Dalbo | D05C 1/065 206/388 |

(Continued)

FOREIGN PATENT DOCUMENTS

WO 2009051381 A1 4/2009

OTHER PUBLICATIONS

International Application No. PCT/US16/23347 International Search Report and Written Opinion of the International Searching Authority (dated Jun. 16, 2016).

(Continued)

*Primary Examiner* — Sunit Pandya

(57) ABSTRACT

A communication system and method are provided to assist a user in conveying and/or exchanging a communication. The present communication system and method provide a low tech platform that enables a user to utilize an icon exchange communication system and method while allowing the integration of core vocabulary instructional concepts and techniques. The present communication system and method allows for seamless presentation of core vocabulary while also providing access to fringe vocabulary words.

12 Claims, 4 Drawing Sheets

(56) References Cited

U.S. PATENT DOCUMENTS

| | | | | |
|---|---|---|---|---|
| 4,907,904 | A * | 3/1990 | Baldwin | B42F 5/00 281/21.1 |
| 5,533,902 | A * | 7/1996 | Miller | G09B 1/06 273/273 |
| 5,895,219 | A * | 4/1999 | Miller | G09B 17/00 283/46 |
| 5,980,354 | A * | 11/1999 | Prest | A63H 33/38 434/171 |
| 6,056,549 | A * | 5/2000 | Fletcher | A63H 33/38 283/46 |
| 6,161,979 | A * | 12/2000 | Yamamoto | A45C 3/02 206/472 |
| 7,140,643 | B1 * | 11/2006 | Smith | B42D 1/10 281/21.1 |
| 8,851,895 | B1 * | 10/2014 | Morrison | G09B 19/04 434/172 |
| 9,311,822 | B2 * | 4/2016 | Lam | G09B 5/06 |
| 2003/0027113 | A1 * | 2/2003 | Curtin | G09B 1/16 434/172 |
| 2009/0280458 | A1 | 11/2009 | Myers | |
| 2010/0227525 | A1 | 9/2010 | Smith | |
| 2010/0315610 | A1 | 12/2010 | Hultermans et al. | |
| 2014/0120799 | A1 * | 5/2014 | Lam | G09B 1/06 446/147 |

OTHER PUBLICATIONS

Autism Speaks Technology and Autism Webinar Series (Nov. 14, 2012).

Myths and Misconceptions You've heard about PECS, but do you really know what it is? The Myths and Misconceptions surrounding the Picture Exchange Communication System™ (PECS) (undated).

What is Augmentative and Alternative Communication (AAC)—(Prentke Romich Company)—available at https://www.prentrom.com/caregivers/what-is-augmentative-and-alternative-communication-aac (undated).

Pragmatic Organisation Dynamic Display (PODD) Communication Books: Direct Access Templates by CPEC available at http://www.spectronics.com.au/product/pragmatic-organisation-dynamic-display-podd-communication-books-direct-access-templates (undated).

Low Tech Solutions Communication Tools available at http://store.lowtechsolutions.org/ (undated).

* cited by examiner

COMMUNICATION SYSTEM AND METHOD

CROSS-REFERENCE TO RELATED APPLICATIONS

The present application claims the benefit of Provisional Patent Application No. 62/143,881, filed on Apr. 7, 2015, the entire disclosure of which is hereby incorporated herein by reference.

TECHNICAL FIELD

This invention relates generally to a communication system and method, more specifically, to an aided augmentive and alternative communication system and method, and even more specifically, to a core vocabulary exchange communication system and method, which may facilitate and/or improve the communication abilities of nonverbal, speech and/or language impaired individuals.

BACKGROUND

Augmentative and alternative communication (AAC) includes all forms of communication, other than oral speech, that are used to express thoughts, needs, wants, and ideas. AAC, may include, for example, facial expressions and/or gestures, sign language, the use of symbols and/or pictures, and written communication.

A variety of AAC systems exist to improve the communication skills of individuals who are nonverbal, speech and/or language impaired. AAC systems may be unaided or aided. Unaided forms of communication consist of nonverbal means of natural communication (including gestures and facial expressions) as well as manual signs and American Sign Language (ASL). Aided forms of communication systems consist of those approaches that provide a user some additional external support to convey a communication (for example, a statement, request, question, demand, or other message)

Aided communication systems may be low tech, such as a communication board or book with visual-graphic symbols or icons (i.e., pictures, photographs, line drawings, symbols, printed words, traditional orthography, and/or combinations thereof) that stand for or represent what an individual wants to express, or high tech, such as a sophisticated computer with symbols, words, letters, or icons that "speaks" for its user via either synthetically produced speech or recorded natural (digitized) speech.

A communication board or book is a no-tech or low-tech AAC system that allows expressive communication by pointing or looking at (or otherwise selecting) a symbol or icon representing the word or idea the user wishes to express. These systems may utilize direct selection (i.e. touching a picture or sentence), partner-assisted scanning with a communication partner, or eye gaze (i.e. looking to the preferred icon). Such communication systems are often static in nature (i.e., the icons remain in a fixed/immovable position on the board).

The Picture Exchange Communication System® (PECS®) protocol refers to a method of teaching language in a low-tech communication system using icons that are stored in a communication binder and are removed and exchanged by the user or communication partner to make a request or comment. The PECS protocol uses icons composed of nouns and phrase-based sentence starters such as "I want" and "I see." Generally, the practitioner (for example, a speech language pathologist (SLP)) must create each of the icons to be used with the PECS protocol for each individual user and the icons are stored in the communication binder at the user's or practitioner's discretion. As a result, existing systems do not provide a consistent organization system for these noun words or carrier phrases and generally do not allow for the growth of expressive language beyond a comment or request.

Existing AAC systems are also generally limited in their ability to allow spontaneous novel utterance generation (SNUG). SNUG is based on access to the individual words, collocations, and commonly used phrases of our language. SNUG allows a person to say anything anytime.

SNUG depends in large part on core vocabulary. Core vocabulary refers to a set of lemmas, or base words, including nouns, pronouns, verbs, adjectives, adverbs, prepositions, conjunctions, and interjections that makes up the majority of language. About 75-85% of what we say (both as children and as adults) comes from a set of about 400-500 core vocabulary words used in most messages across all environments and situations. Typically developing children acquire language in a relatively consistent sequence of identified core vocabulary words. Conversely, only up to about 20% of what we say comes from a bank of thousands of fringe vocabulary words, mostly nouns, which are infrequently used and activity specific.

Knowing that up to about 85% of what children and adults say come from a relatively small set of core vocabulary words, it would be desirable to provide an AAC system in which core vocabulary is an integral part of the system. However, existing AAC systems generally do not include core vocabulary, but instead, consist primarily of nouns and descriptors, which tends to restrict users to requesting and labeling. Thus, existing AAC systems are generally not be flexible enough to meet most communication needs and/or allow for continued growth and language development.

Motor learning is an important key in the learning and use of an AAC system. The more cognitively impaired the person, the more he/she depends on motor learning to learn and use AAC. Motor planning comes with consistency and relative "permanence" where you get the same thing with the same movement plan. The simplest to the most complex neuro-motor activities of daily life are made possible by motor plans. Motor plans and sensory feedback are linked to language learning. Motor plans form through repetition that is meaningful, frequent, and intense. Thus, it is desirable to incorporate motor planning in AAC systems.

There are several benefits of existing low tech communication systems. In general, they are portable, relatively durable, inexpensive, not dependent on battery or electrical power, waterproof, reproducible at minimal cost, capable of teaching persistence skills, and capable of teaching functional communication skills until the user obtains a high tech communication device.

It is desirable for any user with a high tech communication device to have a low-tech system as a back-up if/when the device breaks or needs repairs. Further, any user who is non-verbal or has low functional communication skills deserves access to a low-tech system.

There are, however, some drawbacks of existing low-tech systems, including but not limited to, noun focus and activity focus (i.e., by category such as playtime, mealtime, musical instruments, animals) such that vocabulary does not transfer across environments, the fact that pre-stored phrases and sentences may not always allow student to say what they want to say, the fact that they generally do not align with typical language development, the fact that they have too many phrases and sentences, which do not teach meaning of individual words, the fact that they do not have consistent motor plan access (i.e., words and icons are repeated in different locations on different pages), the fact that they do not allow for teaching of multiple meanings of words, the fact that they lack core vocabulary, which accounts for up to 85% of what we say, and the fact that they do not allow for SNUG (i.e., do not allow for students to say what they want to say whenever they want to say it). Thus, the applicant has determined that existing approaches in these regards leave room for considerable improvement.

SUMMARY

The current invention addresses the foregoing and other shortcomings by the various inventive aspects described herein. In accordance with one aspect of the invention, a communication system is provided that allows a user to implement an icon exchange communication system while also integrating core vocabulary instructional concepts and techniques. In one form, the present communication system provides a low tech platform that combines the two methods. Utilizing the icon exchange component, the present communication system allows for seamless presentation of core vocabulary while also providing access to fringe vocabulary words.

In accordance with another aspect, a communication system is provided, which allows for pre-selected core vocabulary words to be sequenced to create a message at the user's individual language level. As a result, the present communication system allows for SNUG, or spontaneous novel utterance generation. In one form, the use of a communication card allows for different lemmas to be exchanged at the single word level or multi-word level which allows the user to build sentences of increasing complexity. Furthermore, a communication partner may respond back to the user in a two way exchange (for example, by modeling and using language by moving icons on a core vocabulary insert onto a communication card. This two-way exchange, or reciprocity of communication, may advantageously promote conversational exchanges on a topic, wherein core vocabulary icon pieces may be exchanged multiple times onto the communication card between the user and communication partner.

In accordance with another aspect, core vocabulary icon pieces and/or fringe vocabulary icon pieces may be removed from their position on the core vocabulary insert and/or binder insert(s) and visually demonstrated, handed to, or shown to the user and then returned to the original location. Thus, the user may thereby explore language and/or exchange a message with a communication partner without using the communication card. Individual manipulation of icon pieces allows for a practitioner or other communication partner to model language receptively and expressively by removing icon pieces from a consistent predetermined location and returning icon pieces to the same location after use.

In accordance with another aspect, a communication system is provided that utilizes a low tech platform that allow for the seamless presentation of instructional material. For example, the versatility of the present communication system allows a practitioner to select an appropriate instructional tool based on the individual user's needs and abilities, including, for example, Aided Language Stimulation, ABA Style, Pivotal Response Training, Backward Chaining, etc.

In yet another aspect, a communication system is provided that encourages spontaneous novel utterance generation (SNUG) both in symbols and oral communication by combining an icon exchange component with a core vocabulary component.

In yet another aspect, a communication system is provided that utilizes a familiar color coded organizational system consistent with established color coded systems (for example, the Fitzgerald Key and Goosens' Crain and Elder). In another form, icons can also be presented with an alternate color coded organizational system or no color coding system.

In yet another aspect, a communication system is provided that allows a practitioner or user to incrementally incorporate lemmas/icons as the user's core vocabulary language develops. In one form, a series of nine different core vocabulary inserts (small, medium, and large sized inserts may each include small, medium, or large icons) are provided allowing for presentation of range of icons (from up to 20 to up to 189). The number of icons presented may be based on an assessment of the user's individual capabilities. In one form, the size and number of the icons presented may be based on the user's cognitive capabilities and motor skills assessment. Providing different sizes of core vocabulary inserts and icons may advantageously allow the practitioner or user to select the appropriate number and size icons in view the user's visual, finger dexterity, and/or motor integration placement. In another form, the communication system may provide a reference chart explaining the assessment process to assist a practitioner or user in selecting the proper number and/or size of icons to be used and/or to assess whether a core vocabulary insert is appropriate for the user's level of language development.

In yet another aspect, a communication system is provided which may utilize familiar icons consistent with one ore more commercially available symbol/icon sets (including, for example, but not limited to Boardmaker®, Minspeak® and/or SymbolStixs® symbol sets). Advantageously, a practitioner or user may select the icons used with the communication system to match the symbol set(s) used in existing classroom/instructional setting(s) and/or the any planned high tech device that the user may transition to in the future. In another form, the communication system may be used with multi-sensory tiles, which may be recordable and feature a write & wipe surface.

In accordance with another aspect, a communication system is provided wherein duplicate or matching icons/symbols are displayed at predetermined locations on a core vocabulary insert and/or a binder insert (for example, via a preprinted substrate). Consistent positioned of icons may advantageously aid in selecting, removing, and returning the icon pieces to the predetermined locations. In one form, icon pieces may be removably attached to the matching icons with a hold and release fastener such as hook and loop tape, a magnetic fastener, and the like. Thus the icon pieces are both removable and returnable to original predetermined locations after a communication exchange has been made between a user and communication partner.

In yet another aspect, a communication system is provided wherein pre-selected and pre-printed icons presented on a core vocabulary insert are selected in accordance with evidenced based studies. The pre-selection and pre-printing of icons may advantageously significantly reduce the amount of time a practitioner must typically spend creating teaching materials utilizing existing systems. The practitioner needs only to select and add fringe icons specific to the particular user. Further, while the particular symbols or pictures on the icons may vary depending upon the symbol set being used, the lemmas (parts of speech) may remain constant.

In accordance with another aspect, a communication system is provided in which multiple components, which may each be used alone or in combination with other components, include various features to enhance the communication system's ease of use and durability and decrease assembly time for the practitioner or user. For example, in one form, each component has one or more locator mark(s) to indicate to the user or person assembling the communication system the size, type, and location of where a fastener may be placed and the various components may be removably attached. This standardization of hold and release fastener placement and the use of color coding and/or labeling may significantly reduce assembly time and promote concise presentation of the materials thereby benefiting both the user and the practitioner, which can accelerate the learning process. Additionally, the standardization of the communication system may allow a practitioner to transfer from one user to another or even from school to school and have an expectation of how the information will be presented. The practitioner is able to spend less time creating a user's individual communication system and focus on instruction and service delivery.

In another aspect, a communication system is provided wherein the components are advantageously formed of a durable and water resistant or water proof material that may allow the components to be used across all environments including in or near water and during activities in which the communication systems may sustain water exposure. The components may be sanitized using common household cleaning products.

In another aspect, a communication system is provided that includes a communication binder that may accept and store core vocabulary insert(s), binder inserts, and other component(s). In one form, components may be removably attached to the communication binder using a hold and release fastener, such as hook and loop tape (or other suitable hold and release technology). The communication system thereby allows for concise, predictable storage of components/materials and provides more surface area for presentation of information in the same space as the existing communication binders.

In another aspect, a communication system is provided that may have a similar look and feel (visual appearance as well as symbols sets used therewith) of existing high tech electronic devices. A user's familiarity with the look and feel of an electronic device's format may ease the transition from a low tech system to a high tech system when it is determined to be appropriate. For example, in one form, binder inserts may include a plurality of white squares arranged in a grid pattern which may emulate the look of electronic devices that use a white background gridded pattern.

In accordance with another aspect, a communication system is provided that is comprehensive while also offering an affordable low tech platform. Due to financial reasons users are often on waiting lists for high tech digital devices that use core vocabulary. The present communication system advantageously provides users a comprehensive communication system in the interim until they can receive a digital device. Furthermore, electronic devices and software programs may not always be operational when needed. The present communication system provides a "back up" communication system in the even a high tech system is unavailable.

In accordance with another aspect, a communication system is provided for assisting a user in conveying or exchanging a communication. In one form, the communication system comprises a core vocabulary substrate having a plurality of icons displayed on a first surface thereof. Each of the plurality of icons may represent one of a plurality of core vocabulary words. A plurality icon pieces may be removably attached to the surface of the core vocabulary substrate at a predetermined location corresponding to the location of a matching one of the plurality of icons. The core vocabulary insert may also include a communication card landing pad extending from and interconnected with the core vocabulary substrate. The communication card landing pad may be configured to receive a communication card removably attached thereto.

In another form, the communication system comprises a communication binder and a plurality of binder inserts removably attached to the binder. Each of the plurality of binder inserts may comprise an insert surface with a plurality of squares displayed thereon in a grid arrangement. A tab may extend from an edge of each of the plurality of binder inserts. A least one insert icon piece may be configured to be removably attachable to a predetermined location corresponding to one of the plurality of squares. Each one of the insert icon pieces may represent at least one of the user's personal core vocabulary words or fringe vocabulary words. In another form, the icon pieces may be multi-sensory tiles that are recordable and feature a write & wipe surface.

A core vocabulary insert may also be removably attached to the binder. The core vocabulary insert may comprise a substrate having a first substrate surface with a plurality core vocabulary icons displayed thereon. Each one of the core vocabulary icons may represent a core vocabulary word. A second substrate surface interconnected to the first substrate surface may define a communication card landing pad. A plurality of core vocabulary icon pieces may be configured to be removably attachable to the first substrate surface. Each one of the core vocabulary icon pieces may match a corresponding one of the core vocabulary icons displayed on the first substrate surface. Each of the plurality of core vocabulary icon pieces may be positioned at a predetermined location corresponding to the location of the matching core vocabulary icon. In another form, the core vocabulary icon pieces may be multi-sensory tiles that are recordable and feature a write & wipe surface.

A communication card may be removably attachable to either the binder or to the communication card landing pad. The communication card may be configured to have one or more of the plurality of insert icon pieces and the plurality of core vocabulary icon pieces removably attachable thereto to convey or exchange a communication.

In another aspect, a method is provided of using a communication system to assist a user in conveying or exchanging a communication. In one form, the method comprises providing a first substrate comprising a first surface interconnected with a second substrate surface, wherein the first substrate surface has a plurality of core vocabulary icons displayed thereon, with each of the plurality of core vocabulary icons representing at least one core vocabulary word, and wherein the second surface comprises a communication card landing pad; removably attaching a plurality of core vocabulary icon pieces to the first surface, wherein each one of the plurality of core vocabulary icon pieces is removably attached to the first surface at a first predetermined location, the first predetermined location corresponding to a matching one of the plurality of core vocabulary icons; removably attaching a communication card to the communication card landing pad; selecting one or more of the plurality of core vocabulary icon pieces; removing the selected one or more core vocabulary icon pieces from the first surface; positioning the selected one or more core vocabulary pieces on the communication card to convey or exchange a communication; and returning the selected one or more core vocabulary pieces to the first predetermined location.

In another form, the method comprises providing an assembly of a plurality of second substrates, each of the plurality of second substrates comprising a first surface with a plurality of squares displayed thereon in a grid arrangement; removably attaching a plurality of additional vocabulary icon pieces to the first surfaces of the plurality of second substrates, wherein each one of the plurality of additional vocabulary icon pieces is removably attached to a first surface of one of the plurality of second substrates at a second predetermined location, the second predetermined location corresponding to one of the plurality of squares; selecting one or more of the plurality of additional vocabulary icon pieces; removing the selected one or more additional vocabulary icon pieces from the first surface of the second substrate; positioning the selected one or more additional vocabulary pieces on the communication card to convey or exchange a communication; and returning the selected one or more additional vocabulary pieces to the second predetermined location.

Other features and advantages of the invention will become apparent from the following detailed description of the preferred embodiments taken with the accompanying drawings, which illustrate, by way of example, the principles of the invention.

BRIEF DESCRIPTION OF THE DRAWINGS

Embodiments of the current invention are described below, by way of example only, with reference to the following drawings, wherein.

DETAILED DESCRIPTION

With reference to the figures, a communication system 10 is shown. The communication system 10 includes various components, each of which may be used alone or in combination with one or more additional components to facilitate a user's ability to communicate. These teachings are highly flexible and scalable in practice and can serve to leverage a wide variety of existing communication tools and/or methods. They may help accelerate the learning process and/or development of expressive language.

Figures 1, 2:
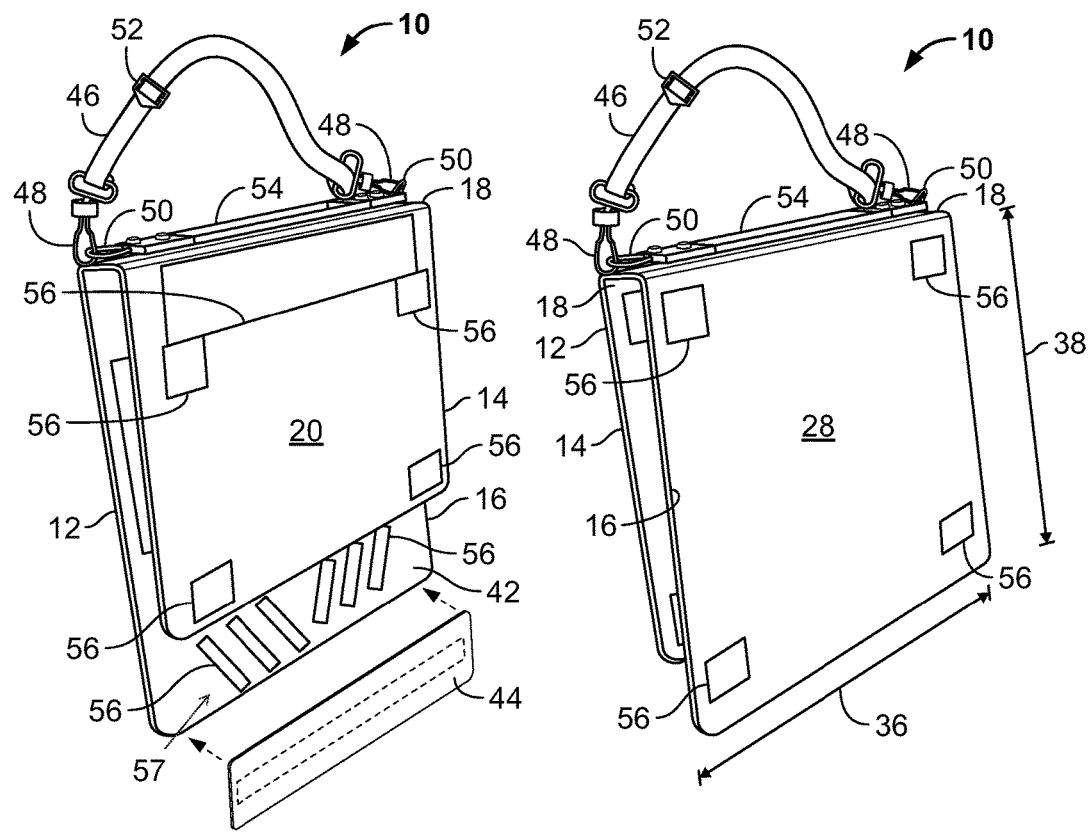
FIG. 1 in a perspective view of a communication binder in accordance with one aspect of the invention.
FIG. 2. is a rear perspective view of the communication binder of FIG. 1.
Figure 3:
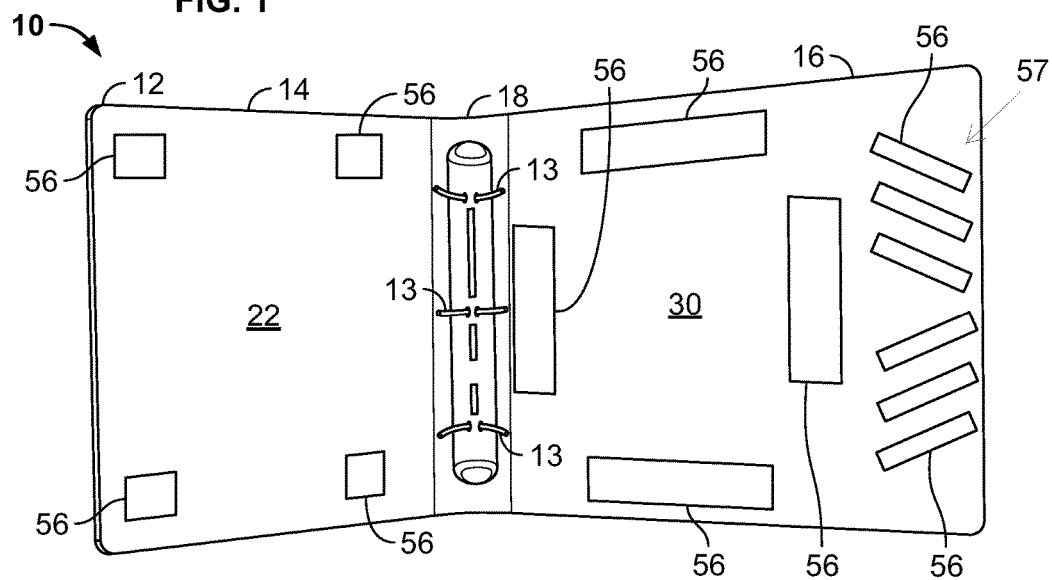
FIG. 3 is a plan view of the communication binder of FIG. 1.

As illustrated, for example, in FIGS. 1-3, in accordance with one aspect, the communication system 10 comprises a portable communication book 12, such as a folder or binder. In one form, the communication book 12 comprises a binder 12, and even more preferably, a 3-ring binder with rings 13 that may be opened and closed. In yet another form, the rings 13 of the binder 12 may be generally D-shaped or O-shaped and may have various sizes.

Binder 12 may be formed of any suitable material. In one form, the binder is formed of sturdy, generally water resistant and/or water-proof material such as a plastic material, which may include but is not limited to polyethylene, PET, polypropylene, PVC, and the like, and/or combinations thereof. Alternatively, the binder may be formed of a laminated board paper stock of appropriate thicknesses and optionally coated or covered in a plastic material.

Binder 12, includes a front cover 14, a back cover 16, and a spine 18 interconnecting the front and back cover 14, 16. The front cover 14 has an exterior surface 20, an interior surface 22, a length dimension, and a width dimension. Likewise, the back cover 16 has an exterior surface 28, an interior surface 30, a length dimension, and a width dimension.

In accordance with one aspect, the width of the front cover and the width of the back cover are the same and thereby define a width 36 of the binder 12. In accordance with another aspect, the back cover 16 has a length that is longer then the length of the front cover and thereby defines the length 38 of the binder. The spine 18, which extends between the front and back covers 14, 16 defines a depth of the binder 12.

As will be readily understood by those of skill in the art, the binder 12 and the front cover 14, back cover 16, and spine 18 may have any suitable dimensions to best accommodate the desired components of the communication system 10. In one form, the width of the front and back covers 14, 16 may each be approximately 9.5 inches. The length of the front cover 14 may be approximately 7.5 inches, while the length of the back cover 16 may be approximately 10.25 inches. The depth 40 of the binder may be approximately 1.25 inches.

As illustrated, since the length of the back cover 16 may be longer than the length of the front cover 14. Thus, when the binder 12 is in the closed position with the front and back covers 14, 16 superposed, a portion of the back cover 16 may extend past the front cover 14 thereby defining a landing pad 42. In one form, the landing pad 42 may have a length of approximately 2.75 inches. As illustrated in FIG. 1, in accordance with another aspect, the landing pad 42 is preferably sized and configured to receive a similarly sized and configured communication card 44 removably attachable thereto.

Communication card 44 may include one or more pieces of releasable or hold and release type fastener (for example, hook and loop tape) on both surfaces. One surface may be used to removably attach the communication card 44 to the landing pad 42. On the other surface, one or more icon pieces 200 may be removably attached to the communication card 44 to form one or more sentence(s) or message(s) thereon. In one form, the communication card 44 may be initially positioned on the landing pad 42 of the binder and be removable so that the user may hand or show the communication card 44 to a communication partner and return the communication card 44 to the landing pad 42 or to another surface as described below.

In accordance with various additional aspects of the invention, the binder 12 may include additional features for improving the ease of assembly and use, portability, durability, and safety of the binder 12. For example, in one form, a carrying strap 46, such as an adjustable shoulder strap, is associated with the binder. The carrying strap 46 may be removably or permanently attached to the binder 12 by any suitable means, including but not limited to, by attaching clips 48 of the carrying strap 46 to compatible rings 50 on the spine 18 of the binder 12. Alternatively, the carrying strap 46 may be attached to the binder by attaching clips 48 of the carrying strap 46 to one or more of the rings 13 of the binder. The carrying strap 46 may be made of any suitable material. In one form, the strap 46 may be formed of a soft, washable material, such as nylon. It may be adjustable in length from about 18 inches to about 36 inches. In yet another form, the strap 46 may include a safety break away device 52 as is known in the art.

The binder 12 may also optionally include a carrying handle 54, for example, on the spine 18 of binder 12.

In another form, the binder 12 may have printed, etched, or otherwise defined thereon one or more locator marks 56 for indicating where a user may affix one or more additional components to the binder 12. For example, the user may wish to removably affix a page, card, folder, insert, or the like to one or more surface of the binder 12. The locator marks 56, may include for example, an outline of a square or rectangle, etc. sized to correspond to the component itself or to one or more releasable or hold and release type fasteners for removably affixing the component. In the illustrated form, for example, the exterior surface 20 of the front cover 14 of binder 12 includes a locator mark 56 sized and configured to receive a page or card or the like including the user's name, picture, and/or or other identifying information thereon. In accordance with another aspect, one or more of the surfaces of the binder 12 may include one or more locator marks 56 sized and configured to allow a user to affix a hold and release type fastener, such a piece of hook and loop tape, adhesive, magnet or other fastener thereto, which may then be used to removably secure one or more additional components such as the additional components described herein to the binder. In yet another aspect, the one or more locator marks 56 may be configured, for example, in size, shape, and positioned, to indicate a suitable configuration for a fastener to be attached thereto. In yet another form, the locator marks 56 may include the fastener (for example, the piece of hook and loop tape) itself.

The landing pad 42 may include a plurality of locator marks 56 arranged thereon. In one form, the locator marks 56 on the landing pad 42 are generally rectangle shaped and arranged at an angle, with one end angled inward toward the center of the landing pad 42 and the other end angled outward toward the edge of the landing pad 2. So configured, the plurality of locator marks 56 form a generally v-shaped or herringbone pattern 57. When hold and release fasteners are attached to the locator marks 56 in pattern 57, they may advantageously allow for ergonomic or ease of release and/or fastening of a communication card 44 thereto. This may be particularly desirable for users with motor and/or strength impairment. In addition to providing easier removal of a communication card 44 (as compared to existing systems which generally utilize a single long strip of fastener), the pattern 57 provides a high probability of a connection being made. While existing systems generally require a user to blindly line up two long strips of hook and loop fastener tape to secure a communication card to a to a landing pad, pattern 57 avoids this. This may in turn allow for simpler and more timely communication exchanges. Less time need be spent fumbling for removal and/or replacement of a communication card.

In another form, the binder 12 may include one or more closure device for securing the binder 12 in a closed configuration. The device may include, but is not limited to, a hold and release fastener such as, but not limited to, hook and loop tape, magnetic clasp, a latch, a strap, a cuff, and the like, or other suitable closure device.

Figure 4:
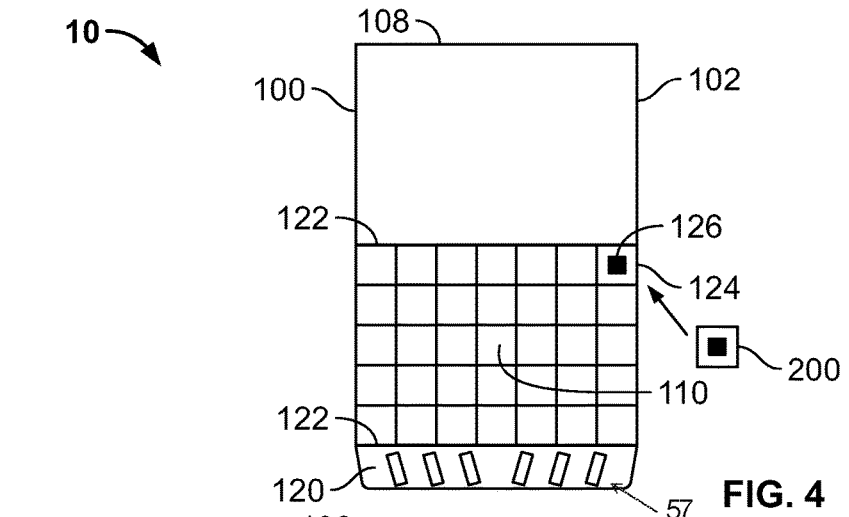
FIG. 4 is a plan view of a single fold core vocabulary insert in accordance with another aspect of the invention.
Figure 5:
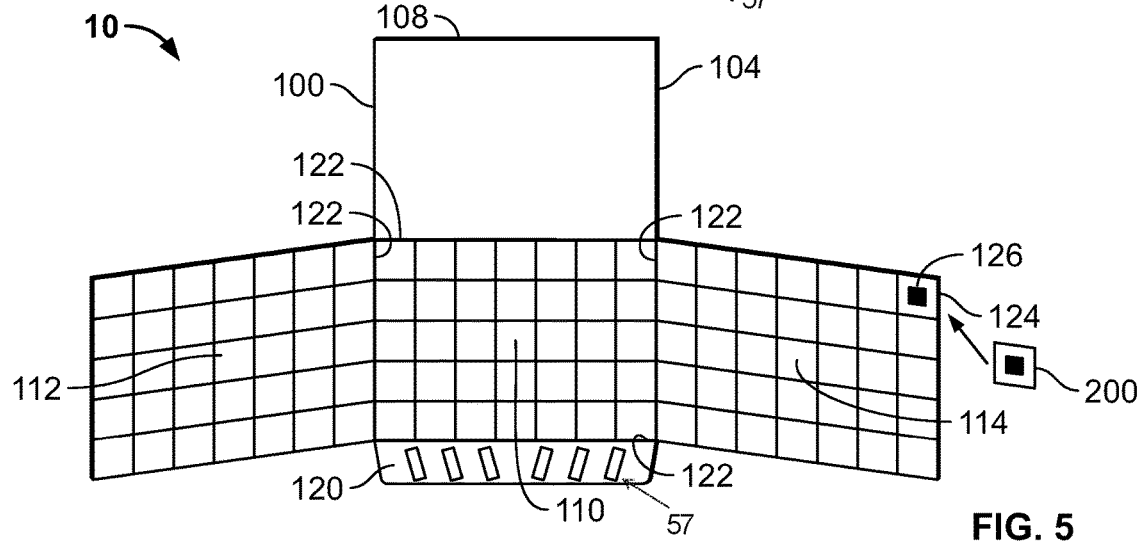
FIG. 5 is a plan view of a gate fold core vocabulary insert in accordance with another aspect of the invention.
Figure 6:
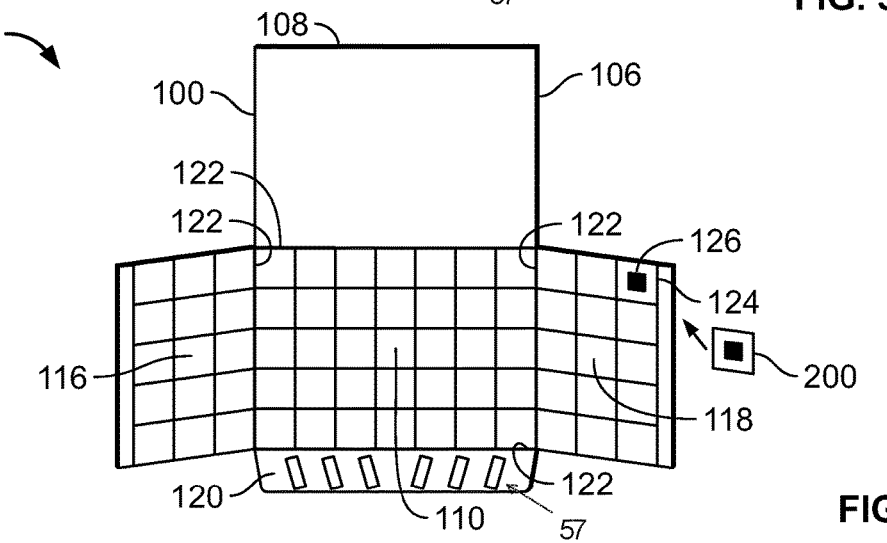
FIG. 6 is a plan view of a tri-fold core vocabulary insert in accordance with another aspect of the invention.

With reference to FIGS. 4-6, the communication system 10 may include one or more folding core vocabulary substrates or insert(s) 100 for removably attaching thereto a plurality of core vocabulary icon pieces 200 (i.e., core vocabulary words depicted in photographs, drawings, symbols, text, and the like, and/or combinations thereof). As illustrated, the communication system 10 may include three different sizes of core vocabulary insert 100, single fold or "small" insert 102 (as shown in FIG. 4), a tri-fold or "large" insert 104 (as shown in FIG. 5), or a gate fold or "medium" insert 106 (as shown in FIG. 6).

Additionally, the communication system 10 may include three different sizes of core vocabulary icon pieces 200 (i.e., small, medium, and large). Thus, with the three different sizes of inserts and three different sizes of icons, the present communication system 10 thereby provides nine different core vocabulary insert 100 options. In one form, the small insert 102 may accommodate up to 20 large sized icons 200, up to 35 medium sized icons 200, and up to 63 small sized icons. The medium insert 106 may accommodate up to 36 large sized icons 200, up to 65 medium sized icons 200, and up to 119 small sized icons. The large insert 104 may accommodate up to 60 large sized icons 200, up to 105 medium sized icons 200, and up to 189 small sized icons. Accordingly, the user or therapist may advantageously select the core vocabulary insert 100 option that best matches the user's language capabilities. Further, the core vocabulary insert 100 may advantageously grow to accommodate more words as the user's language capabilities develop.

As noted above, each of the core vocabulary substrates/inserts 102, 104, 106 may be used on its own or in combination with the binder 12 and/or other components herein described. In one form, each of the core vocabulary inserts 102, 104, 106 may be removably attached to the binder 12. For example, the core vocabulary insert may be three-hole punched with the holes corresponding to the location of the rings in the binder 12. More preferably, each of core vocabulary inserts 102, 104, 106, may include an attaching panel 108, which may include, for example, a hold and release type fastener such as hook and loop tape or other means of removably attaching the attaching panel 108 to one of the surfaces of the binder 12. In one preferred form, the attaching panel 108 may be removably attached to the interior surface 28 of the back cover 16 of binder 12.

As described in further detail below, each of the core vocabulary substrates/inserts 102, 104, 106 includes at least one fold-out surface or sheet for removably attaching the core vocabulary icon pieces 200 thereto. As illustrated in FIG. 4-6, in one form, the small insert 102 includes one full size, center fold-out surface 110. In one form, the center fold-out surface 110 may have a width of about 9 inches and a length of about 7 inches. The large insert 104 may include three full size fold-out surfaces, the center fold-out surface 110, and a pair of opposing side surfaces 112, 114. Each side surface 112, 114 may have a width of about 9 inches and a length of about 7 inches. The medium insert 105 may include the full size, center fold-out surface 110 and a pair of opposing, half size side surface 116, 118. Each of side surfaces 116, 118 may have a width of about 4.5 inches and a length of about 7 inches.

Figure 7:
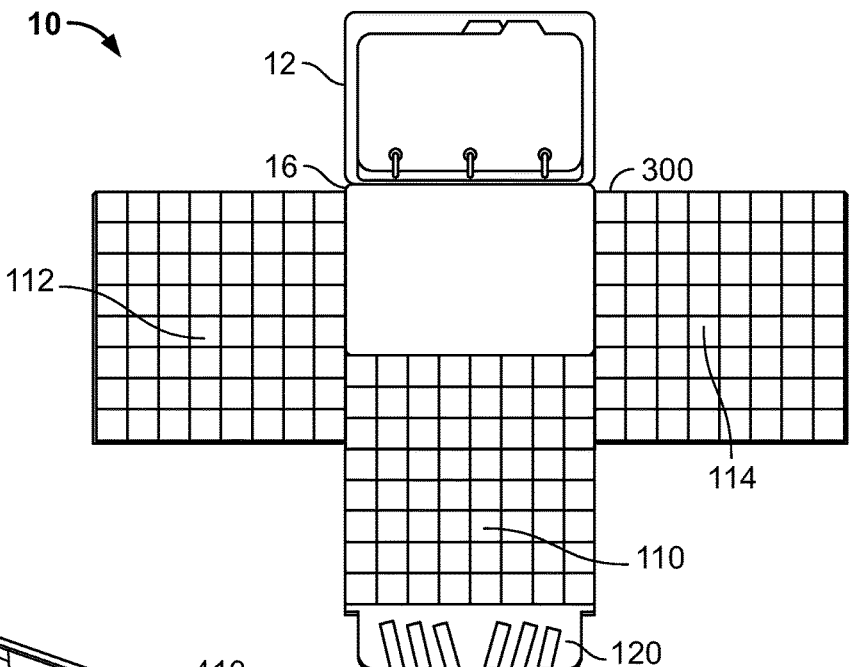
FIG. 7 is a plan view of a communication binder with an integral tri-fold rear cover in accordance with another aspect of the invention.
Figure 8:
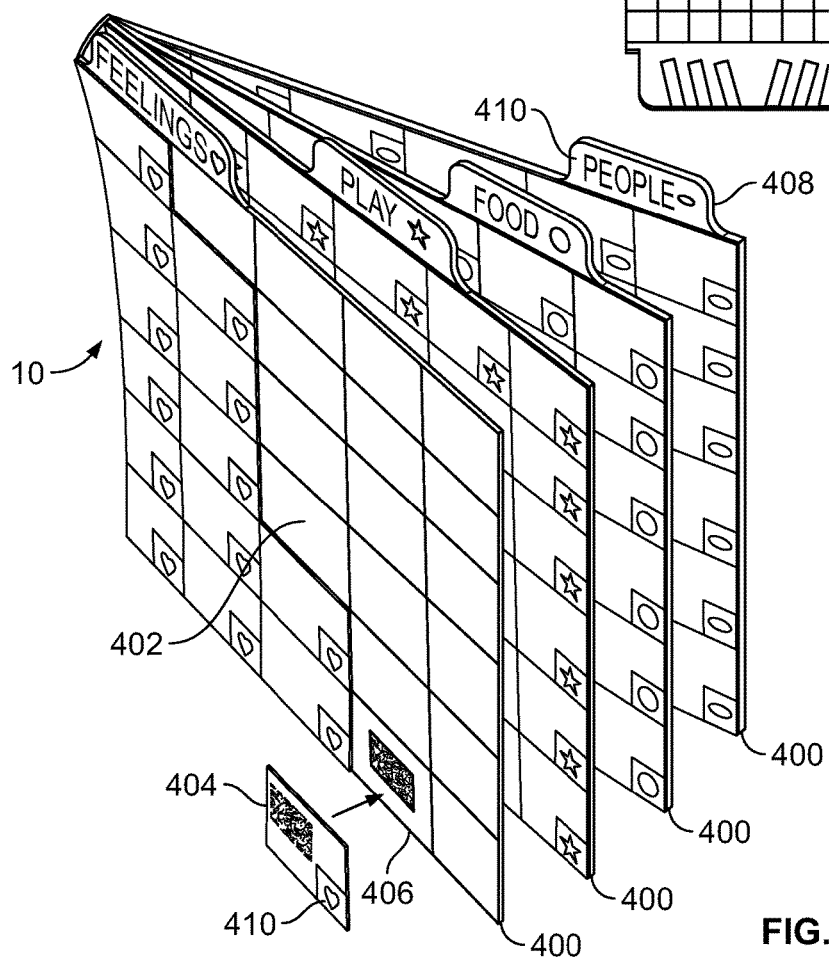
FIG. 8 is a perspective view of a plurality of binder inserts with a plurality of icon pieces in accordance with another aspect of the invention.

In an alternate form, illustrated in FIG. 7, the binder may include an integral fold-out core vocabulary surface 300. For example, in one form, the back cover 16 of binder 12 itself includes at least one fold out surface for removably attaching core vocabulary icon pieces 200. Although FIG. 8 illustrates a binder wherein the back cover 16 comprises a tri-fold integral fold-out core vocabulary surface 300, single fold or gate fold designs are also contemplated.

With reference again to FIGS. 4-7, as illustrated, the center folding surface 110, side surfaces 112, 114 and half size side surfaces 116, 118 may have defined thereon a plurality of squares 124 arranged generally in a grid configuration. Each of the plurality of squares 124 may be sized and shaped to accommodate one of the core vocabulary icon pieces 200, either small, medium, or large sized. In one form, each of the plurality of squares 124 may have a locator mark 56 thereon to indicate where a piece of hook and loop fastener (or other fastener) may be positioned. Additionally, or alternately, each square 124 may include a piece of hook and loop fastener (or other fastener) for removably attaching a core vocabulary icon 200 thereto.

The plurality of squares 124 may be blank, such that the user may removably attach any of the core vocabulary icon pieces 200 to any of the squares 124. More preferably, squares 124 may each have printed, etched, or otherwise defined thereon a core vocabulary icon 126 matching one of the core vocabulary icon pieces 200. In one form, the core vocabulary icons 126 are arranged on the core vocabulary insert 102, 104, 106 in a predetermined, consistent arrangement. Thus, each of the core vocabulary icon pieces 200 may be removably attached to a predetermined location on a surface of the core vocabulary insert 102, 104, 106, the predetermined location corresponding to the location of the matching core vocabulary icon 126 displayed on the surface of the core vocabulary insert 102, 104, 106. Likewise, if a core vocabulary icon piece 200 is removed from the core vocabulary insert to covey a communication, it may be returned to the predetermined location after use.

In another form, the icons 126 and the icon pieces 200 may utilize one or more commercially available symbol/icon sets (including, for example, but not limited to Boardmaker®, Minspeak® and/or SymbolStixs® symbol sets). So configured, a practitioner or user may sensory select the icons 126 on the core vocabulary insert to match any symbol set(s) used in existing classroom/instructional setting(s) and/or the any planned high tech device that the user may transition to in the future.

In accordance with another aspect, the icons 126 and the icon pieces 200 may include a coding system for identifying "subject related" core vocabulary icon pieces 200. In one form, the coding system may be a color coded organizational system wherein different colors represent different subjects. In one form, the icons 126 and/or the icon pieces 200 may include a colored background consistent with established color coded systems (for example, the Fitzgerald Key and Goosens' Crain and Elder). In another form, the icons 126 and the icon pieces 200 may have an alternate color coding system or no color coding system.

In still another aspect, predetermined core vocabulary icons 126 may be masked or covered up. For example, one or more core vocabulary icons 126 may be depicted on the core vocabulary insert 102, 14, 106 without a corresponding core vocabulary icon piece 200 removably attached thereto. Instead, the predetermined masked vocabulary icons 126 may include a mask or blank piece that does not represent the corresponding vocabulary word. The practitioner can thereby select certain vocabulary words to use or not use based on the individual user's circumstances.

In another aspect, each insert 102, 104, 106 may include a landing pad 120. Landing pad 120 may be similar to landing pad 42 of the binder 12 in that it may be sized and configured to receive a removably attachable communication card 44. Like landing pad 42, landing pad 120 may include a plurality of fastener locator marks 56 arranged thereon in a generally v-shaped or herringbone pattern 57.

In one form, the landing pad 120 of each insert 102, 104, 106 may have a width of about 9 inches and a length of about 1.75 inches. When the insert is not in use, the landing pad 120 may fold inward to overlay the central fold-out surface 110. It may be removably held in place with hook and loop tape or other hold and release-type fastener.

In one form, the inserts 102, 104, 106 may have one or more score line(s) 122 between the attaching panel 108 and the center folding surface 110, between the center folding surface 110 and each of the side surfaces, and/or between the center folding surface and the landing pad 120 to facilitate proper positioning when folding each surface over the central fold-out surface 110 for storage in a closed position.

The core communication inserts 102, 104, 106 and the core vocabulary icon pieces 200 may be formed of any suitable material. In one form, the inserts 102, 104, 106 and icon pieces 200 may be formed of a durable, water resistant and/or water proof material such as a plastic material, which may include but is not limited to polyethylene, PET, polypropylene, PVC, and the like, and/or combinations thereof. Alternatively, the inserts and/or icons may be formed of a laminated board paper stock of appropriate thicknesses and optionally coated or covered in a plastic material. In another form, icon pieces 200 may be may be multi-sensory tiles that are recordable and/or feature a write and wipe surface.

With reference to FIG. 8, the communication system 10 may include one or more binder substrates or inserts 400, which may be removably attached to the binder 12. For example, the binder inserts 400 may be removably attached by the rings 13 of binder 12. Alternatively, binder inserts 400 may be attached to binder 12 using hook and loop tape or other suitable release and hold fasteners. Although binder inserts 400 are described herein as being assembled and removable attached to binder 12, other configurations are contemplated. For example, instead of being assembled in a binder, a plurality of binder inserts 400 may be independently bound together along one side thereof by any suitable means.

Binder inserts 400 include surfaces 402 onto which a plurality of vocabulary icons pieces 404 may be removably attached and displayed. Vocabulary icon pieces 404 may include fringe vocabulary words and/or a user's personal core vocabulary words. As illustrated, in one form, each surface 402 may include a plurality of squares 406 arranged in a grid pattern. Each of squares 406 may generally correspond in size and shape to a single vocabulary icon piece 404. Each of the plurality of squares 406 may have a locator mark 56 thereon to indicate where a piece of hook and loop fastener (or other fastener) may be positioned. Additionally, or alternatively, each square 406 may include a piece of hook and loop fastener (or other fastener) for removably attaching a vocabulary icon piece 406 thereto. Alternative configurations, for example, rows or other shapes of hook and loop fastener tape are also contemplated.

In one form, binder inserts 400 may be arranged to allow a user to readily locate, remove, and return appropriate one(s) of the plurality of icon pieces 404. In one form, binder inserts 400 may be arranged by subject matter and/or category. The categories may include, for example, but are not limited to feelings, food play, people, activities, body parts, clothing and accessories, kitchen and/or bathroom items, calendar events, toys and entertainment, common objects, actions and occurrences, furniture, places, transportation vehicles, alphabet characters, numbers, etc. Additional categories may be somewhat more sophisticated such as words or phrases (for example, "who?," "what?," "where?," "when?," "why?," etc.), personal pronoun phrases (for example "I have," "I want," "I need," "I am going," "I don't have," "I don't want," etc.), request phrases (for example "read me," "show me," "get me," "help me," etc.), pronoun phrases, prepositional phrases, social conventions (for example, "yuk," "uh-oh" "yum," "happy birthday," "good morning" etc.) and the like and combinations thereof.

In one form, one or more binder inserts 400 (for example one insert 400, or a collection of adjacent inserts 400) may be devoted to a particular category, with each of the vocabulary icon pieces 404 associated with that particular category removably attached to that particular insert or inserts 400.

To able the user to readily locate a particular category of "subject related" vocabulary icon pieces 404, one or more of the binder inserts 400 may include at least one divider tab 408 extending from at least one edge of the binder insert 400. The divider tab(s) 408 may be structured and positioned to display and/or to carry a title of the particular subject category. In another form, the subject category may also be displayed on a surface 402 of the binder insert 400.

In accordance with another aspect, the binder inserts 400 may include a coding system for arranging "subject related" vocabulary icon pieces 404. In one form, the coding system may be a color coded organizational system wherein different colors represent different categories of vocabulary words (for example, blue for feelings, yellow for play, etc.). In one form, the binder inserts 400 may be arranged in a color coded organizational system consistent with established color coded systems (for example, the Fitzgerald Key and Goosens' Crain and Elder). In another form, binder inserts 400 may be presented with an alternate color coded organizational system or no color coding system. Where a color coding system is used, the binder inserts 400 themselves may be different colors. Alternatively, a color marking may be displayed on one or both surface(s) 402 of an insert 400 and/or on the divider tab 408. Additionally, each of the squares 406 and/or vocabulary icon pieces 404 may include a category identifier mark 410 which may include a color marking.

In another form, the coding system may include a symbol coding system wherein a unique symbol is associated with each subject category (for example, a heart for feelings, a star for play, etc.). Where a symbol coding system is used, a symbol marking may be displayed on one or both surface(s) 402 of an insert 400, on the divider tab 408, and/or on each category identifier mark 410.

In another aspect, a user's personal core vocabulary words and selected fringe vocabulary words may be included on the plurality of binder inserts 400. Thus, as shown in FIG. 8, for example, personal core vocabulary icons 404 falling within the "feelings" category, may be removably attached to the corresponding "feelings" binder insert(s) 400. Further, each of the vocabulary icon pieces 404 preferably include a colored marking and/or symbol marking corresponding to the color and/or symbol of the "feelings" insert(s) 400. In yet another form, the vocabulary icons 404 are customizable for each user using the communication system.

The binder inserts 400 and vocabulary icon pieces 404 may be formed of any suitable material. In one form, the binder inserts 400 and/or icon pieces 404 may be formed of a durable, water resistant and/or water proof material such as a plastic material, which may include but is not limited to polyethylene, PET, polypropylene, PVC, and the like, and/or combinations thereof. Alternatively, the inserts and/or icons may be formed of a laminated board paper stock of appropriate thicknesses and optionally coated or covered in a plastic material. In another form, icon pieces 404 may be multi-sensory tiles that are recordable and/or feature a write and wipe surface.

Figure 9:
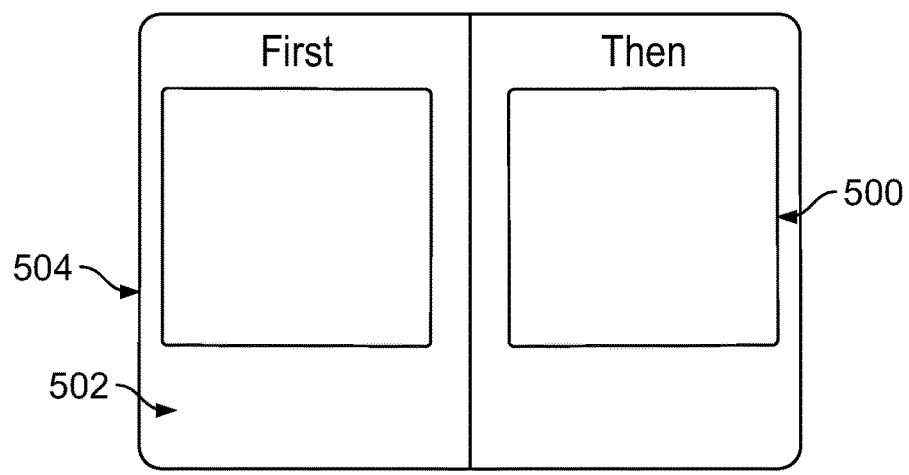
FIG. 9 is a plan view of a First/Then schedule in accordance with another aspect of the invention.
Figure 10:
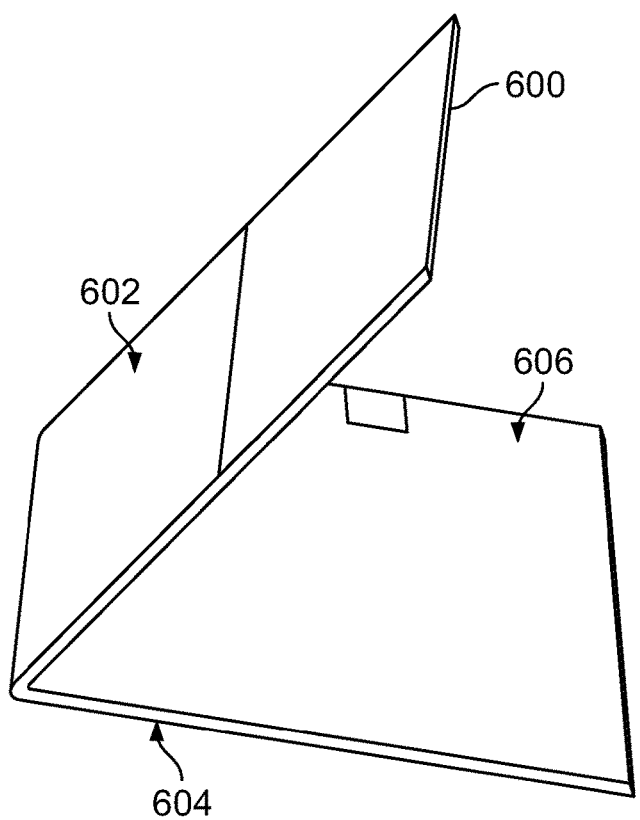
FIG. 10 is a perspective view of a daily schedule in accordance with another aspect of the invention.

With reference to FIGS. 9 and 10, additional optional components of communication system 10 may include a First/Then insert 500, a Daily Schedule 600, and a binder stand (not shown).

The First/Then insert 500 may include at least one surface 502 for removably attaching core vocabulary icons 200 and/or vocabulary icons 404. The First/Then insert 500 may be used to communicate a schedule or priority message to a user. For example, "First, you will do your homework. Then, you may play outside." In one form, the surface 502 is divided generally in half with one side representing the "first" item(s) and the other side representing the "then" item(s). The two sides may be labeled or may include a color or symbol code to represent "first" and "then".

The First/Then insert 500 may include an attaching surface 504, which may include, for example, a hold and release type fastener such as hook and loop tape or other means of removably attaching the attaching surface 504 to one of the surfaces of the binder 12 or other suitable surface (e.g., bulletin board, etc.). The First/Then insert 500 may also include one or more storage surface(s) (not shown), for storing additional icons 200/404 when not in use.

The Daily Schedule 600 may include at least one surface 602 for removably attaching core vocabulary icons 200 and/or vocabulary icons 404. The Daily Schedule 600 may be used to communicate a schedule for the day and may include items yet to be started and/or completed and items that have been completed. In one form, the surface 602 is divided generally in half with one side representing the "yet to be started and/or yet to be completed" item(s) and the other side representing the "completed" item(s). The two sides may be labeled or may include a color or symbol code. In one form, the "yet to be started and/or yet to be completed" side may be green, while the "completed" side may be red.

The Daily Schedule 600 may include an attaching surface 604, which may include, for example, a hold and release type fastener such as hook and loop tape or other means of removably attaching the attaching surface 604 to one of the surfaces of the binder 12 or other suitable surface (e.g., bulletin board, etc.). The Daily Schedule 600 may also include one or more storage surface(s) 606, for storing additional icons 200/404 when not in use.

In another aspect, the communication system 10 may include a stand for binder 12. The stand may advantageously hold binder in an open, standing position, for example on a table or desk.

Each of the First/Then insert 500, the Daily Schedule 600, and the binder stand may be formed of a durable, water resistant and/or water proof material such as a plastic material, which may include but is not limited to polyethylene, PET, polypropylene, PVC, and the like, and/or combinations thereof. Alternatively, they may be formed of a laminated board paper stock of appropriate thicknesses and optionally coated or covered in a plastic material. The binder stand may also be formed of aluminum.

In accordance with still another aspect of the invention, a method is provided for facilitating communication utilizing a communication system as shown and described herein. In one form, the method comprises a core vocabulary exchange system. In another form, the method comprises a combination of a symbol/icon exchange method and a core vocabulary method.

By the present method, icons are presented which represented pre-selected lemmas including core, personal core, and/or fringe vocabulary words. Icons, which may include words, pictures or symbols, and/or combinations thereof, are pre-determined and printed or displayed in a consistent location and removably attached thereto. Icons may be removed selected and removed from their predetermined location to communicate a message and then returned to that predetermined location.

In another aspect, the method provides a communication card on which pre-selected core vocabulary words may be sequenced to create a message at the user's individual language level.

In another aspect, the present method allows for SNUG, or spontaneous novel utterance generation. By incorporating a core vocabulary insert, the method allows for different lemmas to be exchanged at a single word level and/or multi-word level which allows the individual to build sentences of increasing complexity. Furthermore, a communication partner can respond back in a two way exchange to the individual, for example, by modeling and using language by moving icons on a core vocabulary insert or binder insert onto the communication card. This two-way exchange promotes conversational exchanges on a given topic.

In another form, a user may communicate by selecting (or exchanging) one or more of a plurality vocabulary icons removably attached to one or more surfaces in a binder and/or core vocabulary insert. The plurality of vocabulary icons may comprise a plurality of core vocabulary icons removably attached to a fold-out surface on a core vocabulary insert and/or a plurality of vocabulary icons removably attached to a surface on a binder insert. In another form, the one or more of the plurality of vocabulary icons may be displayed in a predetermined, consistent location on the core vocabulary insert and/or binder insert.

In yet another form, the plurality of vocabulary icons comprise a plurality of personal core vocabulary icons and/or fringe vocabulary icons removably attached to color coded and/or symbol coded surfaces in a binder and a plurality of core vocabulary icons removably attached to one or more fold-out of a core vocabulary insert. In another form, a user may select one or icons and position the icon on a communication card to convey or exchange a communication (for example, form a statement, question, request, demand, or other message).

Advantageously, the vocabulary icons of the present communication system—core, personal core, and fringe—align with evidenced-based practices. They may be customized for each individual user to thereby individualize the therapy. This advantageously allows the use of the most appropriate therapy approach or combination of approaches for each user, including ABA, Pivotal Response Training, Backward Chaining, Aided Language Stimulation, Portable Consistent motor plan for core vocabulary words and selectively hiding, or masking, icons. Individualization of therapy methods may thereby accelerate the learning process.

By the present communication system and method, users may have access to core vocabulary, personal core vocabulary, and personalized and color coded and/or symbol coded fringe vocabulary words. The present communication system and method is able to work as a bridge between existing low tech communication systems and a high tech communication devices. It continues to teach initiation and persistence (i.e., using backward chaining hierarchy), and provides a multisensory approach—See it, hear it, say it, do it. The manipulation of icons provides a kinesthetic, tactile, and visual model of language for an individual both receptively and expressively. It provides tactile feedback with physical exchange of icon pieces (i.e., removing one or more vocabulary icon pieces from the fold-out surface and/or colored surfaces, and positioning on a communication card and/or handing to a communication partner). Additionally, it aligns with typical language development.

The communication system and method may be used to teach meanings of single words, and subsequently used to work towards two-word combinations, three-word combinations, etc.

The communication system and method may teach students/users to advocate for themselves. For example, a user may learn to ask for help or protest across environments (access to communication system and method at all times).

The communication system and method of the present invention may be used in connection and/or combination with various methods, for example, backward chaining or ABA principles including discrete trial training and/or aided language stimulation. It can be used across environments, activities, and communication partners. It can be used conjunction with a variety of low-tech core vocabulary symbol sets.

It offers a communication system and method which is supported by an environment where we speak to students/users in a way they understand, such that they learn to communicate.

It can be used to begin introducing core vocabulary when working on "I want." Alternatively, instead of "I want" as one phrase, the icon may be replaced with separate "I" and "want" icons. There may be an additional step in the backward chain to learn the "I want" sequence.

The communication system and method may be used to incorporate core vocabulary words to target communicative intents and functions while progressing at the individual's language level, including protesting (i.e. "stop, stop it, want stop"), requesting assistance ("help," "want help" "I help" "help me"), and indicating cessation ("all done," "Me all done," "you all done"), etc. while also facilitating joint attention.

Although certain presently preferred embodiments of the invention have been illustrated and described herein, it will be apparent to those skilled in the art to which the invention pertains that variations and modifications of the described embodiments may be made without departing from the spirit and scope of the invention. Common but well-understood elements that are useful or necessary in a commercially feasible embodiments are often not depicted in order to facilitate a less obstructed view of these various embodiments of the present invention.

What is claimed is:

1. A communication system for assisting a user in conveying or exchanging a communication, the communication system comprising:

a core vocabulary substrate comprising a first surface having a plurality of icons displayed thereon, each of the plurality of icons representing one of a plurality of core vocabulary words;

a plurality icon pieces removably attached to the surface of the core vocabulary substrate, wherein each of the plurality of icon pieces is removably attached to a matching one of the plurality of icons;

a communication card landing pad extending from and interconnected with the core vocabulary substrate, the communication card landing pad configured to receive a communication card removably attached thereto;

a communication binder comprising a front cover having a first length and a back cover having a second length, the second length being longer than the first length and thereby defining a second communication card landing pad configured to receive a communication card removably attached thereto;

a spine interconnecting the front and back covers;

a first pair of binder surfaces of the front cover and second pair of binder surfaces of the back cover;

a plurality of fastener locator marks displayed on at least one of the binder surfaces; and at least one of a handle and a shoulder strap.

2. The communication system of claim 1, further comprising:
a plurality of releasable fasteners, with a releasable fastener disposed between each of the plurality of icon pieces and the plurality of icons.

3. The communication system of claim 1, wherein the first surface comprises one of: a single fold-out surface having a plurality of icons displayed thereon, a gate fold fold-out surface having a plurality of icons displayed thereon, and a tri-fold fold-out surface having a plurality of icons displayed thereon.

4. The communication system of claim 1, wherein the core vocabulary substrate further comprises a second surface configured for removably attaching the core vocabulary substrate to separate third surface.

5. The communication system of claim 1, wherein the communication card landing pad has a plurality of fastener locator marks displayed thereon, and wherein each of the plurality of fastener locator marks is generally rectangle-shaped and positioned at an angle.

6. The communication system of claim 1, further comprising a communication card configured to receive one or more of the plurality of icon pieces removably attached thereto.

7. The communication system of claim 1, wherein the second communication card landing pad has a plurality of fastener locator marks displayed thereon, and wherein each of the plurality of fastener locator marks is generally rectangle-shaped and positioned at an angle.

8. The communication system of claim 1, further comprising:
at least one binder insert removably attached to the binder, wherein the binder insert has an insert surface having a plurality of squares arranged in a grid pattern thereon;

a plurality of insert icon pieces removably attached to the insert surface, wherein each of the plurality of insert icon pieces represents one of a user's personal core vocabulary words and fringe vocabulary words and wherein each of the plurality of insert icon pieces is sized and configured to be positioned in one of the squares; and a coding system displayed on the at least one binder insert and the plurality of insert icon pieces removably attached thereto, the coding system identifying a category of the at least one binder insert and the plurality of insert icon pieces removably attached thereto.

9. The communication system of claim 8, wherein the coding system comprises at least one of a color coding system and a symbol coding system.

10. The communication system of claim 8, further comprising at least one of: a First/Then insert and a Daily Schedule.

11. A method of using a communication system to assist a user in conveying or exchanging a communication, the method comprising:
providing a first substrate comprising a first surface interconnected with a second substrate surface, wherein the first substrate surface has a plurality of core vocabulary icons displayed thereon, with each of the plurality of core vocabulary icons representing at least one core vocabulary word, and wherein the second surface comprises a communication card landing pad;

removably attaching a plurality of core vocabulary icon pieces to the first surface, wherein each one of the plurality of core vocabulary icon pieces is removably attached to the first surface at a first predetermined location, the first predetermined location corresponding to a matching one of the plurality of core vocabulary icons;

removably attaching a communication card to the communication card landing pad;

providing an assembly of a plurality of second substrates, each of the plurality of second substrates comprising a first surface with a plurality of squares displayed thereon in a grid arrangement;

removably attaching a plurality of additional vocabulary icon pieces to the first surfaces of the plurality of second substrates, wherein each one of the plurality of additional vocabulary icon pieces is removably attached to a first surface of one of the plurality of second substrates at a second predetermined location, the second predetermined location corresponding one of the plurality of squares;

selecting one or more of the plurality of core vocabulary icon pieces;

removing the selected one or more core vocabulary icon pieces from the first surface;

positioning the selected one or more core vocabulary pieces on the communication card to convey or exchange a communication;

selecting one or more of the plurality of additional vocabulary icon pieces;

removing the selected one or more additional vocabulary icon pieces from the first surface of the second substrate;

positioning the selected one or more additional vocabulary pieces on the communication card to convey or exchange a communication;

returning the selected one or more core vocabulary pieces to the first predetermined location; and returning the selected one or more additional vocabulary pieces to the second predetermined location.

12. The method of claim 11, further comprising:
displaying a coding system on the plurality of second substrates and the plurality of additional vocabulary icon pieces, the coding system identifying a category of each one of the plurality of second substrates and the plurality of additional vocabulary icon pieces, wherein the coding system comprises at least one of a color coding system and a symbol coding system.

* * * * *